Patented Feb. 17, 1925.

1,526,501

UNITED STATES PATENT OFFICE.

WALTER T. MULLEN, OF STOCKTON, CALIFORNIA.

FORMULA FOR A WINDSHIELD PREPARATION.

No Drawing.    Application filed September 25, 1923. Serial No. 664,774.

*To all whom it may concern:*

Be it known that I, WALTER T. MULLEN, a citizen of the United States, residing at Stockton, county of San Joaquin, State of California, have invented certain new and useful Improvements in Formula for a Windshield Preparation; and I do declare the following to be a full, clear, and exact description of the same.

This invention relates to a preparation for windshields and the like to maintain the visibility therethrough in foggy or rainy weather; my main object being to produce a preparation for the purpose which will be useful in both rainy and foggy weather, preventing the fog from clouding the glass and the rain from streaking the same—a common source of annoyance and danger with which every car driver who has driven in inclement weather is acquainted.

I have also produced a preparation for the purpose which when properly applied is practically invisible, which maintains the glass in as clear a condition when wet as when dry, and which does not collect dust in dry weather, when once the composition has dried on the glass.

The preparation is so efficient that it is not necessary to apply the same afresh after each shower of reasonably short duration, each application being good for at least a full day's driving in the rain or fog.

Owners possessed of expensive and highly finished cars need not fear to use my preparation on their windshields, since it does not harm paint or varnish, nor is it harmful to the hands or to fabrics.

While I have specifically in mind to use the preparation for windshields, it is of course suitable for street-car and locomotive cab windows, boat pilot-house windows and in fact anywhere necessary to insure visibility for a driver or operator behind the glass.

The preparation is also of value as a polish for plate glass generally.

The ingredients of my preparation are concentrated tobacco juice, essence of lemon (oil of lemon-rind) extract of onion, hydrochloric or muriatic acid, and distilled water. These are mixed together in the following proportions:

|                      | Parts by volume. |
|----------------------|------------------|
| Tobacco juice        | 3                |
| Oil of lemon-rind    | 1                |
| Onion extract        | 1                |
| Muriatic acid        | 1                |
| Distilled water      | 2                |

The tobacco juice particularly prevents rain from streaking glass, while the muriatic acid prevents fog from clouding the same. The oil of lemon rind and extract of onion form a transparent and slick, yet non-dust collecting coating on the glass when once the composition has dried thereon, since they are not of an oily nature, even though the lemon-rind essence is designated as an "oil". At the same time, these latter ingredients together form a sort of adhesive between the other ingredients and the glass, taking the place of glycerine as commonly used in other preparations for the same purpose. The water serves of course to thin the preparation to the desired consistency.

Distilled water is specifically called for, as this aids in preventing the souring of the preparation in the bottle.

The preparation is preferably applied to the glass as a thin layer or coating by means of a sponge. Any surplus liquid is allowed to drain off by itself, since as previously stated, no harm will be done to paint or other finished surface onto which the preparation may flow.

The glass will then be found to retain its clearness under rain or fog conditions, and visibility therethrough will be absolutely unimpaired.

The muriatic acid, besides functioning as above set forth, causes the preparation to dry on a windshield within a very few minutes after its application thereto, so that dust will not collect after such time. The same coating of the preparation even after once being exposed to rain, will be again effective thereagainst within a reasonable time, even though the coating has dried in the meantime; provided of course that the same has not been definitely wiped from the glass.

Having thus described my invention, what I claim as new and useful and desire to secure by Letters Patent is:

1. A preparation for use on glass for the purpose set forth consisting essentially of tobacco juice, essence of lemon, onion extract and hydrochloric acid.

2. A preparation for use on glass for the purpose set forth consisting essentially of tobacco juice, essence of lemon, onion extract and hydrochloric acid in the proportions by volume of 3 parts of tobacco juice, and one each of the essence of lemon, onion extract and acid.

3. A preparation for use on glass for the purpose set forth consisting of tobacco juice, 3 parts; essence of lemon, 1 part; onion extract, 1 part; hydrochloric acid, 1 part; and distilled water, 2 parts, all by volume.

4. A preparation for use on glass for the purpose set forth including tobacco juice, hydrochloric acid, and transparent and non-oily ingredients for causing the juice and acid to adhere to glass.

5. A preparation for use on glass for the purpose set forth including ingredients preventing rain from streaking on glass and fog from clouding the same, and onion extract and essence of lemon-rind mixed with said ingredients.

In testimony whereof I affix my signature.

WALTER T. MULLEN.